(12) United States Patent
Yamaguchi

(10) Patent No.: US 6,547,446 B2
(45) Date of Patent: Apr. 15, 2003

(54) HYBRID CONNECTOR

(75) Inventor: Noboru Yamaguchi, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/881,840

(22) Filed: Jun. 18, 2001

(65) Prior Publication Data

US 2002/0002003 A1 Jan. 3, 2002

(30) Foreign Application Priority Data

Jul. 3, 2000 (JP) .......................................... 2000-201355

(51) Int. Cl.[7] .................................................. G02B 6/36
(52) U.S. Cl. ............................ 385/53; 385/88; 439/577
(58) Field of Search ............................... 385/53, 70–75, 385/88, 92; 439/577, 588, 603

(56) References Cited

U.S. PATENT DOCUMENTS 6,341,899 B1 * 1/2002 Shirakawa et al. ............ 385/88
6,357,931 B1 * 3/2002 Shirakawa et al. ............ 385/75

FOREIGN PATENT DOCUMENTS

JP 9-61677 3/1997

* cited by examiner

*Primary Examiner*—Khiem Nguyen
(74) *Attorney, Agent, or Firm*—Armstrong, Westerman & Hattori, LLP

(57) ABSTRACT

A hybrid connector is provided, by which the optical loss can be reduced. In the hybrid connector, a housing is provided integrally with receiving cylinders for holding sleeves. An end of the receiving cylinders, into which the corresponding sleeve is inserted, is provided with an engaging part, with which a shield case engages. The case has a spring property so that each optical element module received in the case can be pressed against the corresponding receiving cylinder and/or the corresponding sleeve when the case engages with the engaging parts.

2 Claims, 6 Drawing Sheets

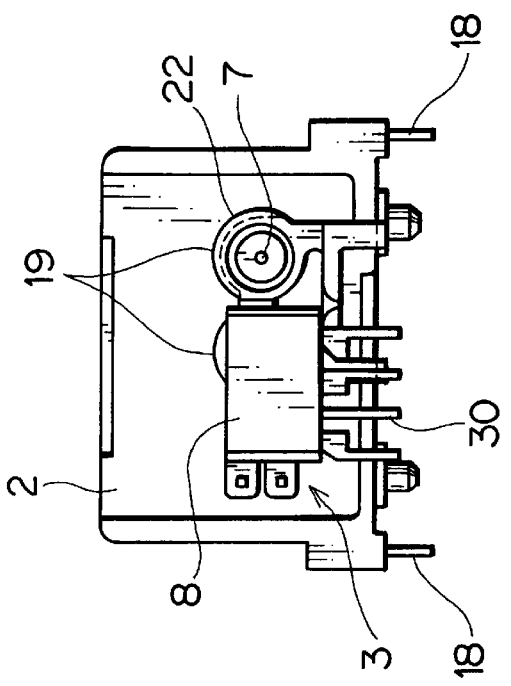
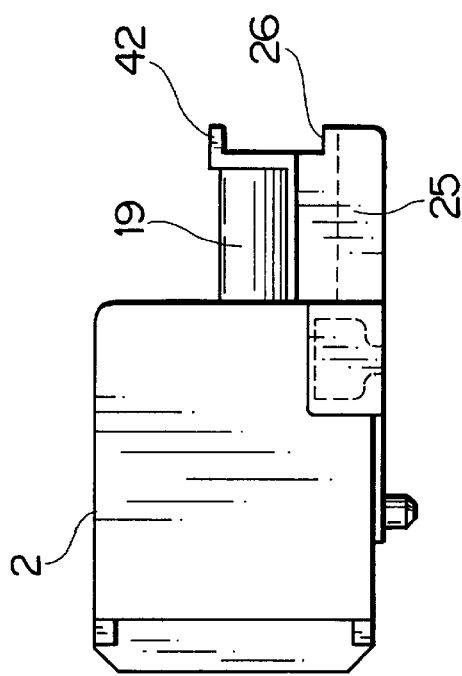
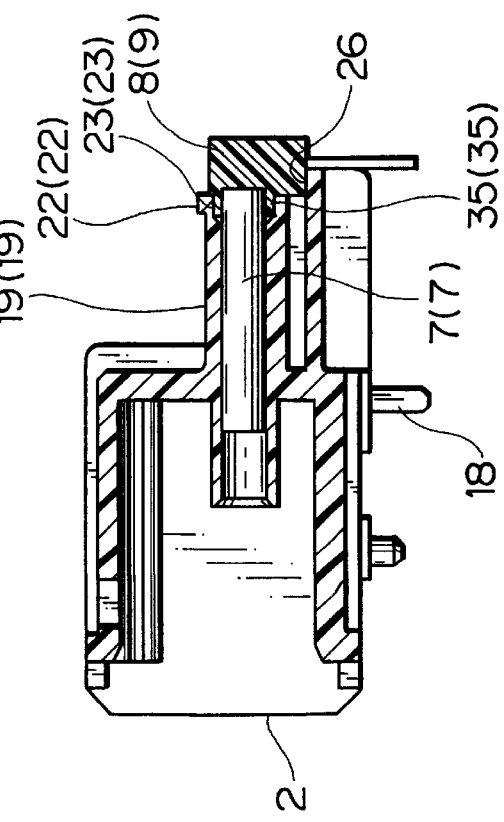
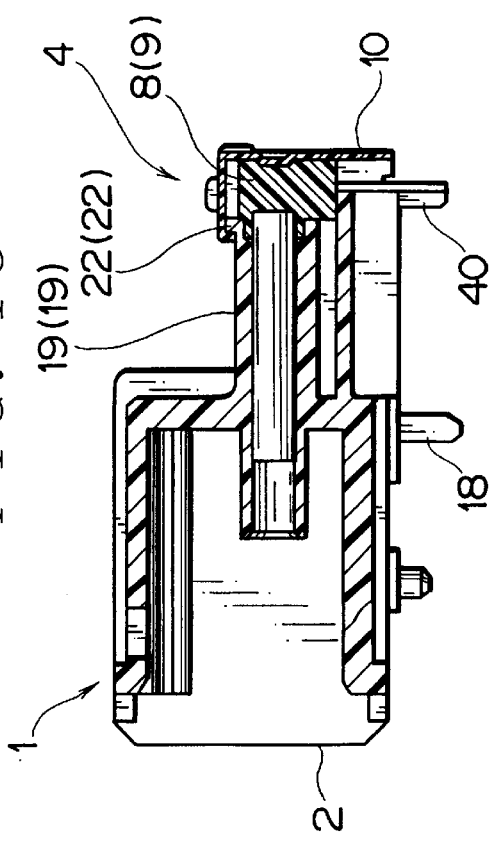

HYBRID CONNECTOR

BACKGROUND OF THE INVENTION (1) Field of the Invention

The present invention relates to a hybrid connector, in which electric and optical connectors are integrally formed so that a single connecting operation completes the connection between the electric and optical connectors.

(2) Description of the Related Art

With regard to various vehicles including motorcars, a very many signals from various sensors and those for controlling various electronic equipment have to be handled. When these signals are transmitted by using individual signal lines, the number of the signal lines becomes enormous, causing a wiring harness to be very heavy. In addition, in recent years, information transmitted from various electronic equipment has been enhanced and made much denser, causing a wiring harness to be furthermore heavy. Therefore, recently, a part of a wiring harness has been replaced by an optical fiber cable (optical fiber cord) and for example, a system in which an optical fiber cable connects nodes with each other has been employed.

When a part of a wiring harness is to be replaced by an optical fiber cable, for example for a motorcar manufacturer, an operation for connecting the electric and optical connectors becomes complicated and troublesome. Consequently, recently, a hybrid connector, in which electric and optical connectors are integrally formed so that a single connecting operation completes the connection between the electric and optical connectors, has been developed for its practical use.

However, since the hybrid connector is formed in such a way that the electric and optical connectors are integrally constituted therein, the hybrid connector is forced to have many components. Especially, when the number of components with respect to the optical connector increases, a clearance, which arises upon the assembly of the components with each other, becomes a main cause of the optical loss and may have an adverse effect on the communication. For example, when a relatively large clearance arises between an optical element module and a sleeve, which constitute the optical connector, the optical loss at the clearance portion becomes large.

SUMMARY OF THE INVENTION

It is therefore an objective of the present invention to solve the problem described above and to provide a hybrid connector, by which the optical loss can be reduced.

In order to attain the above objective, the present invention is to provide a male hybrid connector comprising electric and optical connectors formed integrally with each other, wherein the optical connector includes: at least one optical element module having an optical element; sleeves, each of which has an optical waveguide, provided in accordance with the number of the optical element modules; a housing shared with the electric connector; and a case for holding the optical element modules, the housing is provided integrally with receiving cylinders for holding the sleeves, an end of the receiving cylinder, into which the corresponding sleeve is inserted, is provided with an engaging part, with which the case engages, and the case has a spring property so that each optical element module received in the case can be pressed against the corresponding receiving cylinder and/or the corresponding sleeve when the case engages with the engaging parts.

According to the constitution described above, the hybrid connector has the housing provided integrally with the receiving cylinder for holding the sleeves. Therefore, the number of the components is decreased and no assembling between the receiving cylinder and the housing is necessary, thereby preventing a troublesome clearance from arising. Upon an assembly, when the case is engaged with the receiving cylinder after the case receives the optical element modules, the optical element modules can be pressed against the receiving cylinder and or the sleeves since the case has a spring property, thereby preventing a troublesome clearance from arising.

Preferably, the case is made of an electrically conductive metal sheet.

According to the constitution described above, the case is free from a troublesome clearance and has an electromagnetically shield effect.

BRIEF DESCRIPTION OF THE DRAWINGS

FIG. 10 is a sectional view illustrating a fully inserted state in a second assembly step after the optical element module is pressed;

FIG. 11 is a rear view of the state shown in FIG. 10;

FIG. 13 is a sectional view illustrating a state, in which the assembly is completed;

FIG. 14 is a right side view illustrating another example of the housing; and

FIG. 15 is a perspective view illustating the primary part of the view shown in FIG. 14.

DESCRIPTION OF THE PREFERRED EMBODIMENTS

In the following, a preferred embodiment of the present invention will be explained with reference to the attached drawings.

Figure 1:
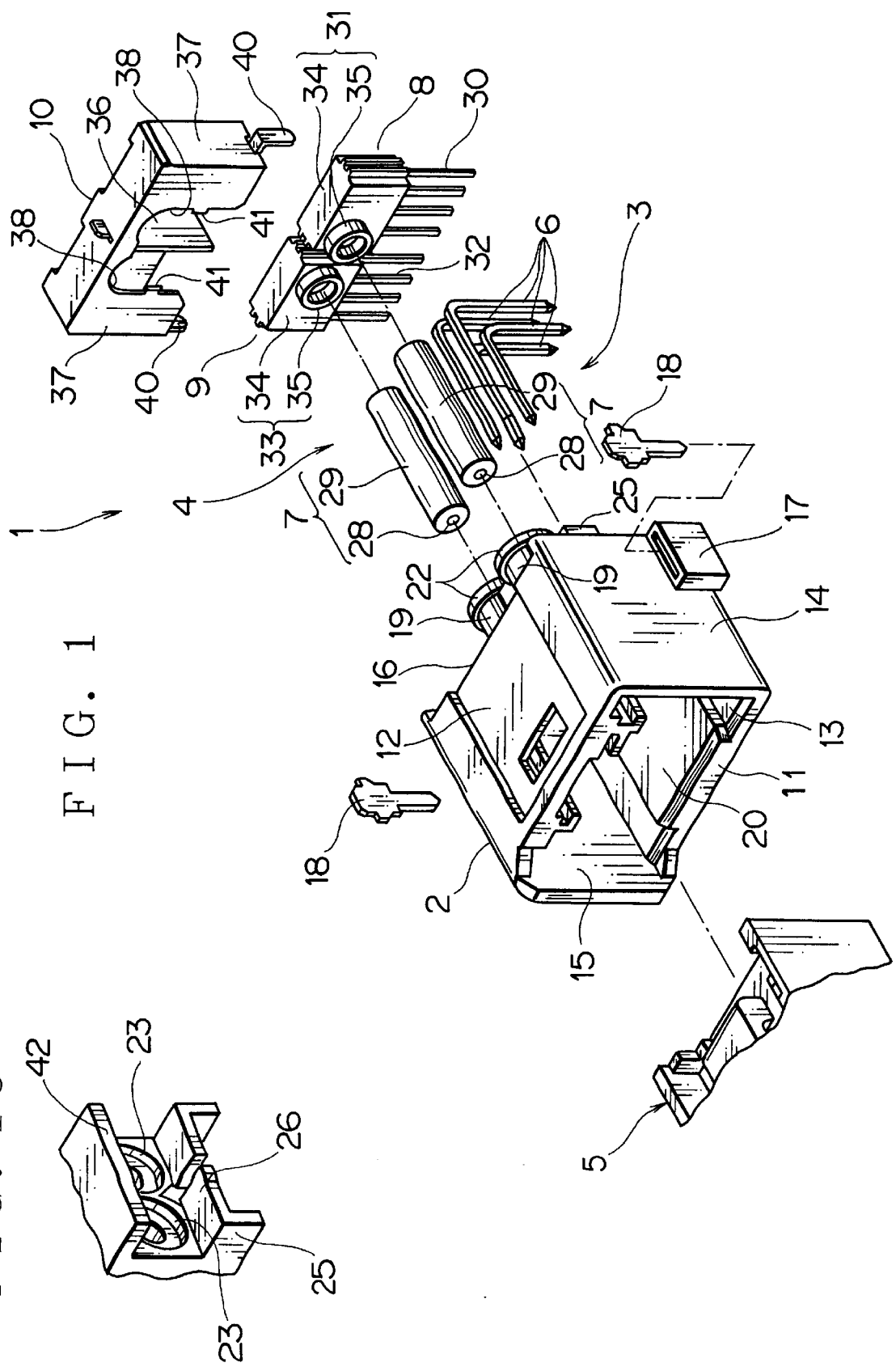
FIG. 1 is an exploded perspective view of a hybrid connector according to a preferred embodiment of the present invention.
Figure 2:
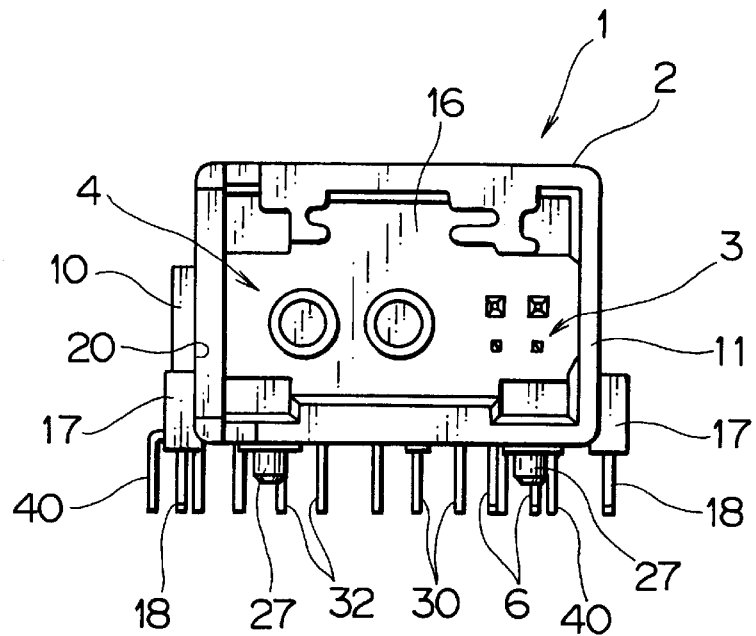
FIG. 2 is a front view of the hybrid connector.
Figure 3:
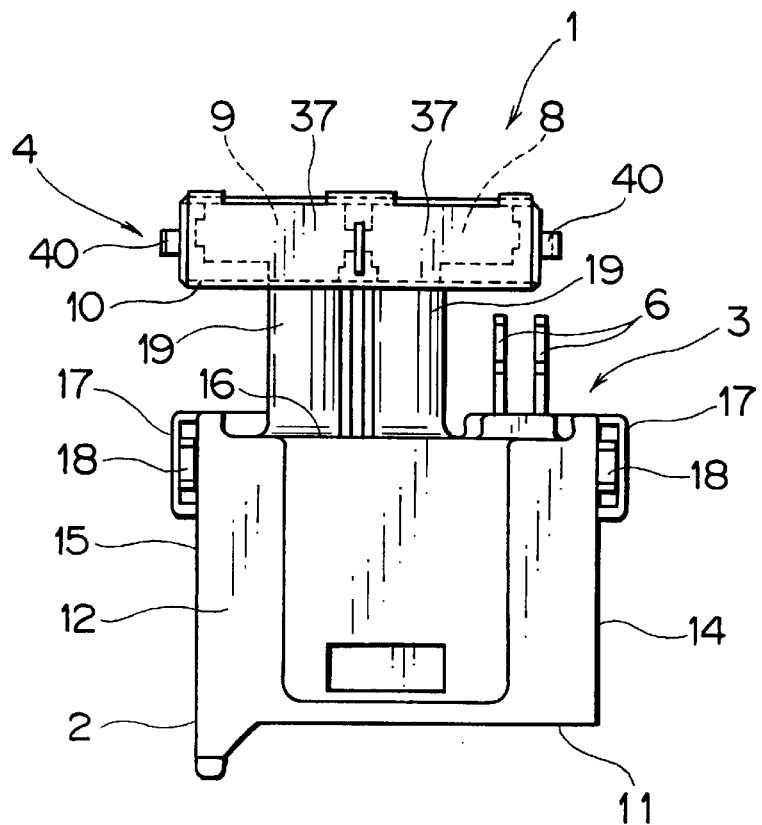
FIG. 3 is a plan view of the hybrid connector.
Figure 4:
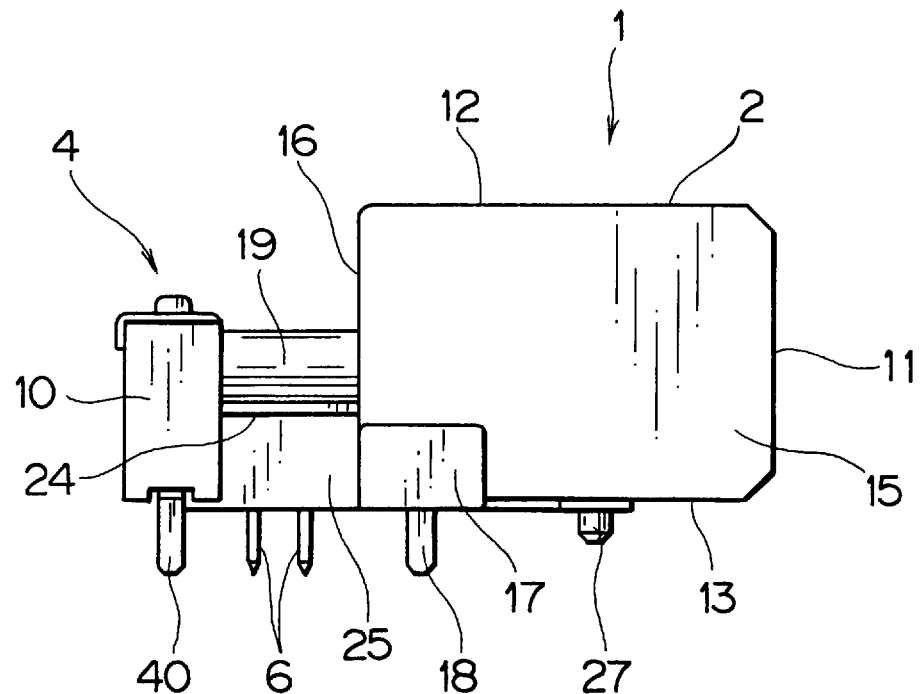
FIG. 4 is a left side view of the hybrid connector.
Figure 5:
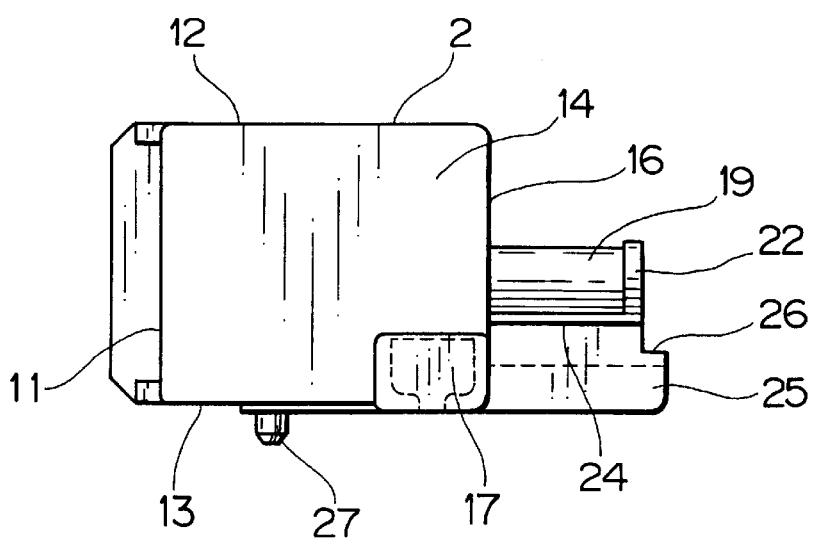
FIG. 5 is a right side view of the housing.

FIG. 1 is an exploded perspective view of a hybrid connector according to a preferred embodiment of the present invention. FIG. 2 is a front view of the hybrid connector; FIG. 3 is a plan view of the hybrid connector; FIG. 4 is a left side view of the hybrid connector; and FIG. 5 is a right side view of the housing.

In the present specification, the hybrid connector is defined as a connector, in which electric and optical connectors are integrally formed.

In FIG. 1, the reference numeral 1 denotes a male hybrid connector to be mounted on a print-circuit board, which is not shown in the figure. The hybrid connector 1 comprises an electric connector 3 and an optical connector 4, both of which share a housing 2.

The hybrid connector 1 is connected to a female hybrid connector 5, in which two optical fiber cables (optical fiber cords; not shown in the figure), on a respective end of which a ferrule is mounted, are mounted in parallel in a housing of the female hybrid connector 5. Out of the two optical fiber cables, one is for transmitting while the other is for receiving. On an end face of the ferrule, there is exposed a core portion ((plastic) optical fiber consisting of a core and a clad), an optical axis of which aligns with that of a corresponding optical waveguide 28 in a sleeve 7 explained later on.

The electric connector 3 consists of the housing 2 and electric terminals (PCB terminals) 6. The optical connector 4 consists of the housing 2, the sleeves 7, optical element modules 8 and 9, and a shielding case 10. The optical element modules 8 and 9 of the optical connector 4 may be called a receiving/emission module, receiving/transmitting module or a fiber optic transceiver (FOT). The shielding case 10 corresponds to the case described in the claims.

In the following, each element of the hybrid connector 1 will be explained with reference to FIGS. 1–5, thereafter the assembly (method of the assembly) of the hybrid connector 1 will be explained in detail.

The housing 2 made of an insulative synthetic resin is formed in a rectangular box shape, in which a front face 11 is open. That is, the housing 2 is formed in a rectangular box shape with an upper wall 12, bottom wall 13, right sidewall 14, left sidewall 15 and an inside wall 16. The upper wall 12 is provided with a lock portion, with which a locking arm formed on the hybrid connector 5 is engaged. Each of the right sidewall 14 and the left sidewall 15 is provided with a corresponding pocket 17 for receiving a fixing pin 18 made of metal therein and engaging with the same. Each pocket 17 is provided with a through hole, which is opened at the print-circuit board side, and a part of the fixing pin 18 is fixed to the print-circuit board through the through hole.

The inside wall 16 of the housing 2 is provided integrally with a pair of receiving cylinders 19, which are formed in a cylindrical shape so that the inner cross section thereof is round. Each receiving cylinder 19 has a length in accordance with the length of the sleeve 7. The receiving cylinders 19 protrude toward an engaging space 20 for engaging with the hybrid connector 5 in the housing 2 and are formed to also protrude toward the rear of the inside wall 16. The ferrules are inserted from the engaging space 20 side.

Figure 6:
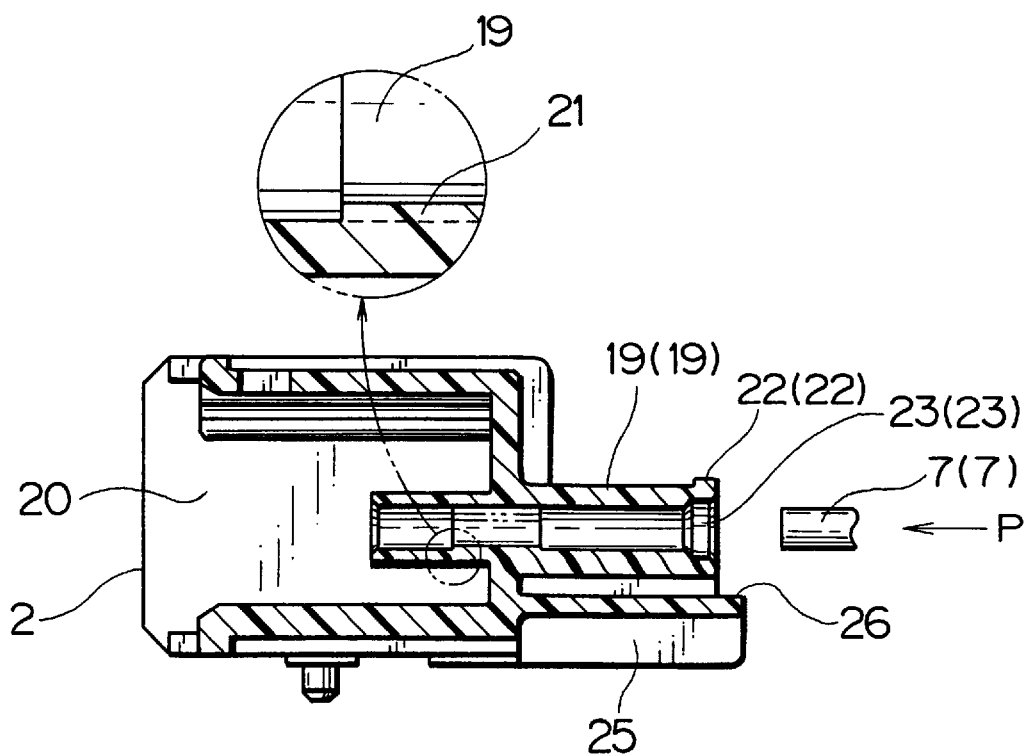
FIG. 6 is a sectional view illustrating a first assembly step before the insertion of the sleeve.

On an inner face of the receiving cylinder 19 at the middle thereof in the length direction, there are formed, for example, three first projections 21 (see FIG. 6). The three first projections 21 are formed along the length direction of the receiving cylinder 19 with 1200° pitch. A diameter of a circular arc drawn by the end of the three first projections 21 is formed a little smaller than the diameter of the sleeve 7 and the sleeve 7 inserted into the receiving cylinder 19 is press fit thereinto crushing the three first projections 21. The inner diameter of the receiving cylinder 19 is set up so that each sleeve 7 can be smoothly inserted thereinto until the sleeve 7 comes into contact with the three first projections 21.

On the outside end of each receiving cylinder 19 at the side from which the sleeve 7 is inserted, a corresponding engaging part 22 protruding with having a ring-shape is integrally formed with the receiving cylinder 19. On an end face of the outside end, there is formed a hollow portion 23 (see FIG. 6 or FIG. 15) depressed along the axis of the receiving cylinder 19. On the outside end of each receiving cylinder 19 at the side of the right sidewall 14 and the left sidewall 15, there is provided a step 24. In addition, at the bottom wall 13 side thereof, a leg 25 is continuously formed.

The protruding direction of the engaging part 22 crosses at right angles with respect to the axis of the receiving cylinder 19 and the thickness of the engaging part 22 is formed to give a enough stiffness threreto so that it can resist against a force acting along the axis of the receiving cylinder 19. The shielding case 10 engages with the engaging parts 22.

The diameter of the hollow 23 is larger than that of the inner diameter of the receiving cylinder 19. The hollow 23 engages with a second projection 35 (explained later on) of the optical element module 8 and 9. Each step 24 is formed along the axis of the receiving cylinder 19 and engages with a corresponding stopper 41 (explained later on) of the shielding case 10.

The leg 25 is formed in a letter H-shape in a cross sectional view thereof and the portion, which protrudes rearward exceeding the end face of the end of the receiving cylinder 19, is provided with a wall 26, which crosses at right angles with respect to the end face. The wall 16 serves as a stopper to prevent the optical element modules 8 and 9 from rotating and is formed to have a flat surface in the present preferred embodiment.

Under the bottom wall 13 of the housing 2, there are integrally formed third projections 27 to be inserted into the print-circuit board.

Each electric terminal 6 is a known electrically conductive male terminal having a letter L-shape. Out of two parts of the L-shape, one part is situated in the engaging space 20 of the housing 2 through the inside wall 16, while the other part is to be fixed on the print-circuit board. Since the electric terminals 6 are mounted on two steps upper and lower (two terminals on each step) with respect to the housing 2, the electric terminals 6 having two different kinds of length are needed.

Each sleeve 7 consists of an optical waveguide 28 consisting of a core and a clad and a cylindrical holder 29. Preferably, the optical waveguide has an equivalent refractive index to that of the core portion of the optical fiber cable. The sleeve 7 can be formed by using the optical fiber cable. (That is, the sleeve 7 is cut to have a predetermined length and an end surface of the sleeve 7 is, for example, polished.)

The optical element module 8 consists of a plurality of lead frames 30, a molded part (not shown in the figure), and a case 31. A light-emitting element (not shown in the figure) is mounted on one lead frame 30 out of a plurality of the lead frames 30. The wire bonding method is applied. A plurality of the lead frames 30 are fixed on the print-circuit board by soldering. The light-emitting element is situated near to the optical element module 9, i.e. a little away from the center of the optical element module 8 (or the center of the molded part) so as to make the hybrid connector 1 compact. (The light-emitting element may be situated at said center.) The light-emitting element corresponds to an optical element described in claims and is, for example, a light-emitting diode (LED).

The molded part is made of light-transmitting transparent resin such as epoxy resin, i.e. preferably a resin having an equal refractive index to that of the core portion of the optical fiber cable. The molded part buries the top half of a plurality of the lead frames 30 and protects the light-emitting element and so on.

The optical element module 9 consists of a plurality of lead frames 32, a molded part (not shown in the figure), and a case 33. A light-receiving element (not shown in the figure) is mounted on one lead frame 32 out of a plurality of the lead frames 32. The wire bonding method is applied. A plurality of the lead frames 32 are fixed on the print-circuit board by soldering. The light-receiving element is situated near to the optical element module 8, i.e. a little away from the center of the optical element module 9 (or the center of the molded part) so as to make the hybrid connector 1 compact. (The light-receiving element may be situated at said center.) The light-receiving element corresponds to an optical element described in claims and is, for example, a photodiode (PD).

In the present preferred embodiment, since the light-emitting element and the light-receiving element are shifted so as to be adjacent to each other, the hybrid connector is formed compact. Moreover, since a part of the optical element module 8 is arranged so as to overlap with the electric terminals 6 leaving a distance with respect to the electric terminals 6, the hybrid connector is formed even more compact.

Each of the cases 31 and 33 is made of an electrically conductive synthetic resin (or electrically insulative synthetic resin) containing carbon fibers and the like, and consists of a case housing 34 and a cylindrical second projection 35 protruding from the case housing 34.

Each case housing 34 has a shape of box having the bottom, into which the molded part is inserted by a little pressing. An opening (for inserting the molded part) of the case housing 34 is formed flat, which is put on the wall 26 upon the assembly. A wall situated at the opposite side of said opening is also formed flat.

Each second projection 35 is formed in accordance with the position of the light-emitting element and the light-receiving element. Since the second projection 35 is cylindrical, the second projection 35 can face the light-emitting element and the light-receiving element. The second projection 35 engages with the hollow portion 23 upon the assembly.

The shield case 10, formed by pressing an electrically conductive metal sheet, has a spring property useful upon the assembly and so on. The shield case 10 has two receiving parts 37 partitioned by a wall 36, in each of which a U-shaped notched portion 38, a fourth projection 39 (see FIG. 12) that presses the optical element module 8 or 9 onto the notched portion 38 side, and a leg 40 for fixing the case 10 on the print-circuit board are formed.

The receiving part 37 receives the optical element module 8 or 9. When the optical element modules 8 and 9 are received into the receiving parts 37 together with the engaging parts 22 upon the assembly, the optical element modules 8 and 9 are press-held with the aid of said spring property.

When the shielding case 10 has a spring property so that the respective optical element modules 8 and 9 can be pressed onto the end face of the corresponding receiving cylinders 19, the case 10 can be made of an electrically conductive synthetic resin containing carbon fibers and the like. The electrically conductive case 10 improves the shielding property thereof for the optical element modules 8 and 9.

Each notched portion 38 is formed in accordance with the outer diameter of the receiving cylinder 19, at the periphery of which a projecting stopper 41 protruding inwardly is formed. When the case 10 is combined with the receiving cylinders 19, the projecting stopper 41 engages with the step 24 of the receiving cylinders 19. That is, the projecting stopper 41 prevents the case 10 from coming off.

Each fourth projection 39 (see FIG. 12) is formed on the rear wall situated at the opposite side of the, front wall, on which the corresponding notched portion 38 is formed. The fourth projection 39 is protrudingly formed, for example, in an ellipse shape by an. embossing press. Each leg 40 for fixing the case 10 on the print-circuit board is continuously formed to the sidewall of the receiving parts 37 and is fixed on the print-circuit board. The leg 40 functions as a ground terminal.

In the following, an example of the assembly (method of the assembly) of the hybrid connector 1 will be explained in detail. The electric terminals 6 are received in the housing 2 in advance. In the following, the assembly (method of the assembly) of the optical connector 4 portion will be explained.

After the electric connector 3 portion is assembled, the optical connector 4 portion is to be assembled in sequence through first to third assembly steps.

Figure 7:
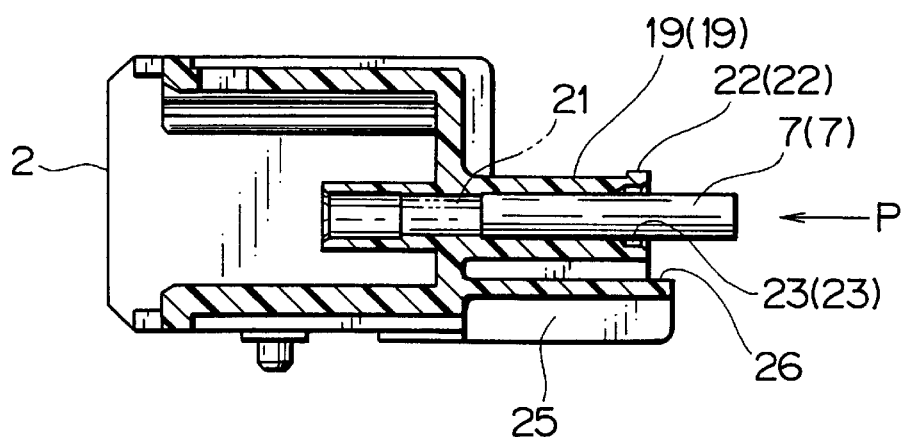
FIG. 7 is a sectional view illustrating a provisionally inserted state in the first assembly step being halfway through the insertion of the sleeve.
Figure 8:
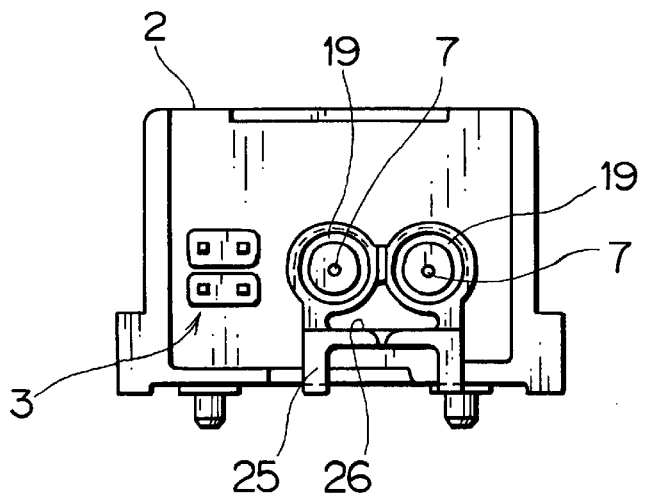
FIG. 8 is a rear view of the state shown in FIG. 7.

The first assembly step will be explained with reference to FIGS. 6–8. FIG. 6 is a sectional view illustrating the first assembly step before the insertion of the sleeve, FIG. 7 is a sectional view illustrating a provisionally inserted state in the first assembly step being halfway through the insertion of the sleeve, and FIG. 8 is a rear view of the state shown in FIG. 7.

In FIG. 6, the sleeves 7 are moved in the direction of arrow P with being held the sides thereof. The sleeves 7 move toward the end face of the receiving cylinder 19. Then, the sleeves 7 are inserted into the receiving cylinder 19 from the end face of the receiving cylinder 19 in the direction of arrow P and then, as shown in FIG. 7, each end of the sleeves 7 comes in contact with the first projections 21. At this time, each sleeve 7 is halfway inserted into the receiving cylinder 19 (the provisionally inserted state). As shown in FIG. 8, when two sleeves 7 are provisionally inserted, the assembly advances to the second step.

Figure 9:
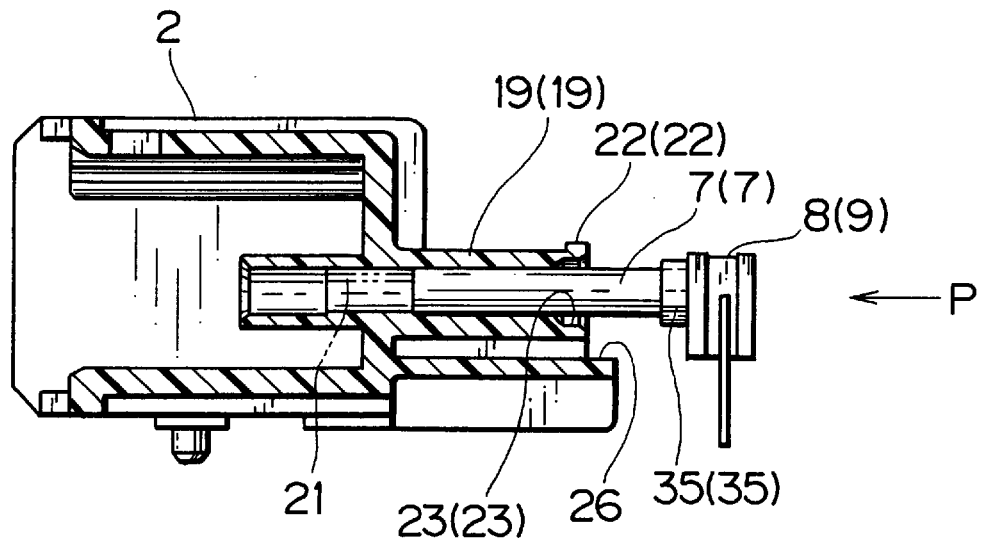
FIG. 9 is a sectional view illustrating a state, in which the optical element module is started to be pressed, in a second assembly step.

The second assembly step will be explained with reference to FIGS. 9–11. FIG. 9 is a sectional view illustrating a state, in which the optical element module is started to be pressed, in the second assembly step, FIG. 10 is a sectional view illustrating a fully inserted state in the second assembly step after the optical element module is pressed, and FIG. 11 is a rear view of the state shown in FIG. 10.

In FIG. 9, the respective optical element modules 8 and 9 are set on the corresponding end faces of the sleeve 7, which is exposed from the receiving cylinder 19. The end face of the sleeve 7 is received in the second projection 35 and in this state, when each of the optical element modules 8 and 9 is pressed in the direction of arrow P, the sleeve 7 is further inserted crushing the three first projections 21, then a state (fully inserted state) shown in FIG. 10 is realized. The second projection 35 of each of the optical element modules 8 and 9 is inserted in and engaged with the hollow portion 23 of the receiving cylinder 19, thereby the light-emitting element and the light-receiving element are positioned so as to be aligned with the axis of the corresponding receiving cylinder 19 (the axis of the corresponding sleeve 7). The wall 26 prevents each of the optical element modules 8 and 9 from rotating (see FIGS. 10 and 11). For example, at this time, the fixing pins 18 are fixed to the print-circuit board.

At this time, the insertion amount of the sleeves 7 is determined by the optical element modules 8 and 9. There is no clearance between each sleeve 7 and the corresponding optical element module 8 or 9, thereby the optical loss due to the clearance is minimized. Furthermore, since the second projection 35 of each of the optical element modules 8 and 9 is inserted in and engaged with the hollow portion 23 of the receiving cylinder 19, each position of the light-emitting or light-receiving element is aligned with the axis of the corresponding receiving cylinder 19, thereby the optical loss due to the discrepancy in the alignment between axes is reduced.

In the second assembly step, since each of the optical element module 8 or 9 presses the corresponding end face of each sleeve 7, the end face is free from the fat of the human hand, thereby the deterioration in the transmitting efficiency due to the assembly is prevented from occurring.

As shown in FIGS. 14 and 15, if a second wall 42 is provided at the opposite side of the wall 26, the walls 42 and 26 put the optical element modules 8 and 9 therebetween, thereby each of the optical element modules 8 and 9 is more securely prevented from rotating. With the constitution described above, the assembly of the shielding case 10 is easily carried out in the following third assembly step.

Figure 12:
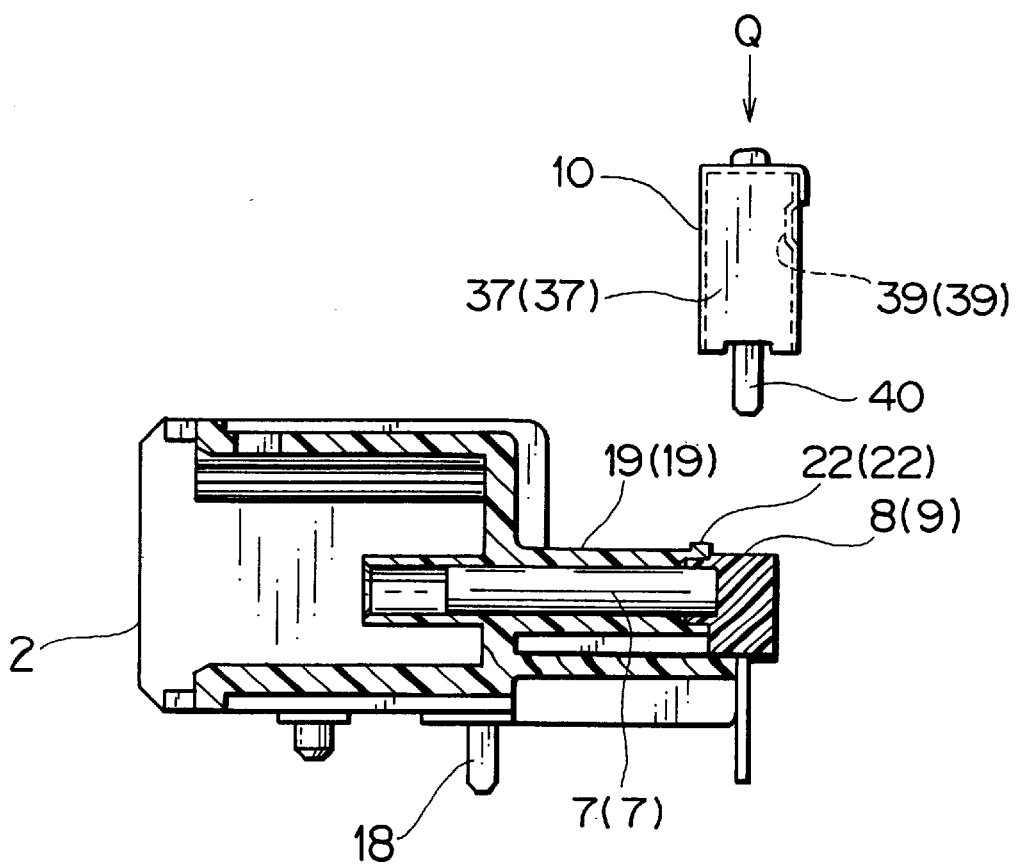
FIG. 12 is a sectional view illustrating a third assembly step before the mounting of the shield case.

After the fully inserted state is realized as described above, the assembly advances to the third step. The third assembly step will be explained with reference to FIGS. 12 and 13. FIG. 12 is a sectional view illustrating the third assembly step before the mounting of the shield case and FIG. 13 is a sectional view illustrating a state, in which the assembly is completed.

As shown in FIG. 12, the shielding case 10 is mounted from the direction of arrow Q. As shown in FIG. 13, the shielding case 10 engages with the engaging parts 22 to hold the optical element modules 8 and 9 therein. The shielding case 10 presses the optical element modules 8 and 9 against the end face of the corresponding receiving cylinders 19. Thus, each position of the optical element modules 8 and 9 is determined and fixed.

Since the optical element modules 8 and 9 are prevented from rotating, the shielding case 10 is easily assembled.

As explained above, in the hybrid connector 1, since the housing 2 is integrally formed with the receiving cylinders 19, the number of the components constituting the hybrid connector 1 is reduced. Since there is no process for assembling the housing 2 and the receiving cylinders 19 with each other, no clearance arises therebetween. Moreover, upon the assembly, since the shielding case 10 has a spring property so that each of the optical element modules 8 or 9 can be pressed against the end face of the corresponding receiving cylinder 19 and the end face of the corresponding sleeve 7, the clearance therebetween can be restrained. Therefore, the optical loss can be reduced.

The aforementioned preferred embodiment is described to aid in understanding the present invention and variations may be made by one skilled in the art without departing from the spirit and scope of the present invention. The present invention can be also applied to a use for bidirectional communication employing single-core optical fibers.

As described above, according to the present invention, a hybrid connector is provided, by which the optical loss can be reduced.

In addition, the case for holding the optical element modules is made of an electrically conductive metal sheet, therefore the optical element modules can be shielded electromagnetically.

What is claimed is:

1. A male hybrid connector comprising electric and optical connectors formed integrally with each other,
    wherein the optical connector includes:
        at least one optical element module having an optical element;
        sleeves, each of which has an optical waveguide, provided in accordance with the number of the optical element modules;
        a housing shared with the electric connector; and
        a case for holding the optical element modules being enclosed within a shielding case,
        wherein the housing is provided integrally with receiving cylinders for holding the sleeves, an end of each receiving cylinder, into which a cooperating sleeve is inserted, being provided with an engaging part which operates to engage the shielding case and
        the shielding case having a property operative to longitudinally urge the case in a direction that each optical element module received in the shielding case is pressed against at least one of a cooperating receiving cylinder and a cooperating sleeve when the case, engaged by the engaging parts, is enclosed within the shielding case.

2. The male hybrid connector according to claim 1, wherein the shielding case is made of an electrically conductive metal sheet.

* * * * *